B. M. DOWNS & W. S. COOK.
SAFETY SIGNAL DEVICE.
APPLICATION FILED MAR. 15, 1915.
1,169,138.
Patented Jan. 25, 1916.
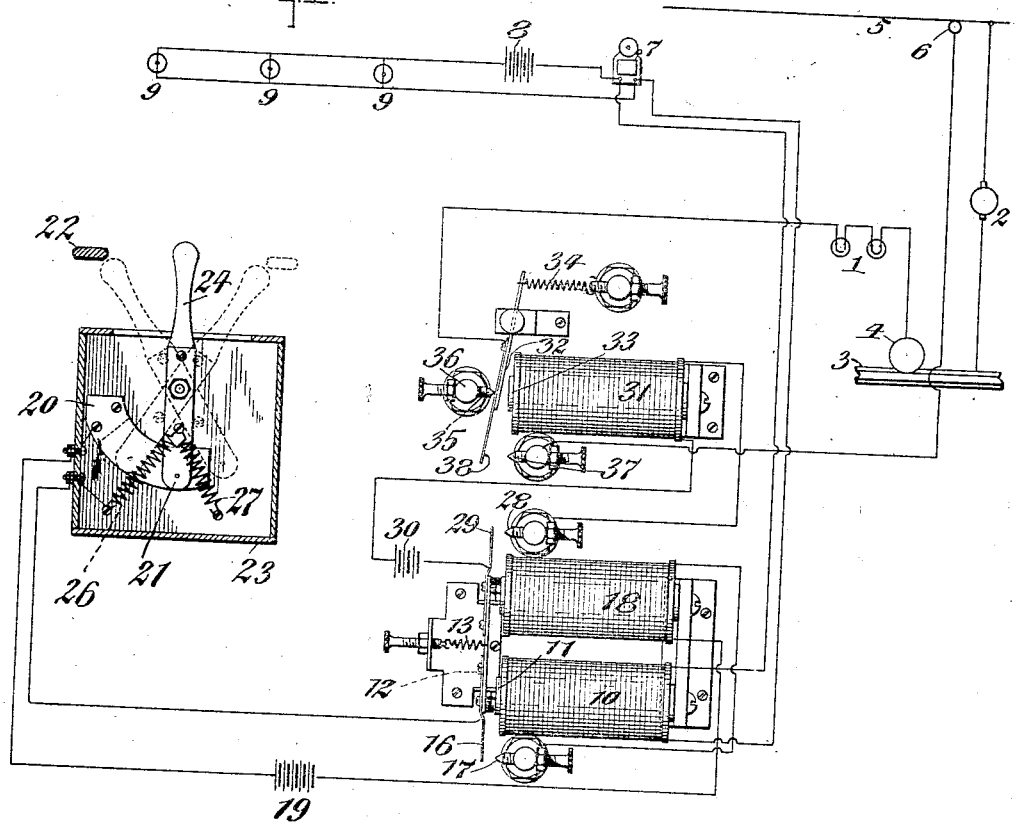
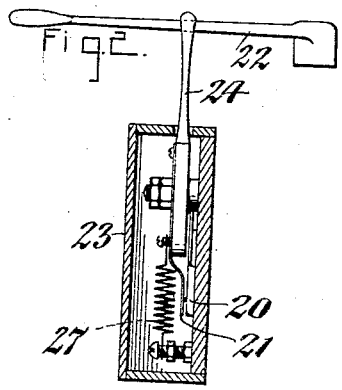
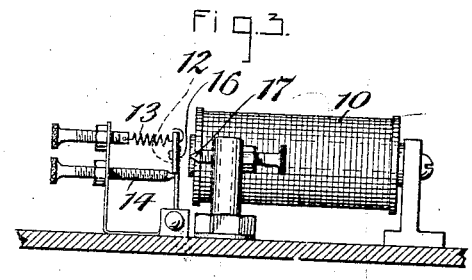
WITNESSES:
Julius J. Pritle
W. Ray Taylor
INVENTORS
Benjamin M. Downs
Walter S. Cook
by Cooper & Pope
ATTORNEYS

UNITED STATES PATENT OFFICE.

BENJAMIN M. DOWNS, OF BUFFALO, AND WALTER S. COOK, OF LACKAWANNA, NEW YORK.

SAFETY SIGNAL DEVICE.

1,169,138.  Specification of Letters Patent.  Patented Jan. 25, 1916.

Application filed March 15, 1915. Serial No. 14,351.

*To all whom it may concern:*

Be it known that we, BENJAMIN M. DOWNS and WALTER S. COOK, citizens of the United States, residing at Buffalo, in the county of Erie and State of New York, and Lackawanna, in the county of Erie and State of New York, respectively, have invented new and useful Improvements in Safety Signal Devices, of which the following is a specification.

This invention relates to a safety signal apparatus whereby one person may signal other persons that a certain act is about to be performed so that such other persons may be placed on their guard, this signal apparatus being preferably so constructed that a cautionary or safety signal is given which remains effective after the means which were initially operated to produce this result have become inoperative and which remains effective until instrumentalities operable elsewhere in the device have been actuated in order to restore the device to its normal inoperative condition as a whole. An apparatus of this character is particularly desirable for use in connection with motor cars, such as automobiles and street cars in order to enable a passenger or other person on the car to not only give the stop signal to the motorman that the particular person giving the signal wishes to alight but also operate a prolonged safety signal which may serve as a warning to vehicles in the vicinity of the car that the same is about to come to a stop and thereby avoid accidents, this prolonged or auxiliary signal continuing in operation until the motorman manipulates means for again rendering the auxiliary signal inoperative. A device of this character is equally useful in connection with stationary machines and other places which require protection against accidents in order to warn persons in the vicinity of the machine that the same is about to be started or stopped.

In the accompanying drawings: Figure 1 represents a diagrammatic view showing our invention organized for use as a signal device for electric trolley street cars. Fig. 2 is a vertical section taken in line 2—2, Fig. 1. Fig. 3 is a sectional side elevation of the starting electro-magnetic switch of our improved signaling apparatus.

Similar characters of reference indicate corresponding parts throughout the several views.

When our improved signaling apparatus is applied to a trolley car it is preferable to utilize the electric current which is ordinarily supplied to the car for propelling the same as a current for also lighting the safety or warning signal lamp, bell or indicator 1 of this system. This current may be supplied in any suitable manner, for instance by an electric generator 2 one pole of which is connected with the track 3 on which one or more wheels 4 of the car run while the other pole of the generator is electrically connected with the trolley wire 5 or other conductor with which the trolley wheel 6 of the car engages.

7 represents an ordinary electric signal such as now commonly installed on street cars in the vicinity of the motorman for the purpose of notifying the latter that one or more of the passengers wish to get off at the next crossing or station. As shown in Fig. 1 this notice or stop signal is represented as an electrical bell but, if desired, the same may be constructed in the form of a buzzer or any other suitable form of signal device. The terminals of this stop signal are arranged in an electric circuit which includes an electric battery or generator 8, and one or more push buttons or initial manual switches 9, located in different parts of the car to enable passengers to notify the motorman where they wish the car to stop.

10 represents the coil of a starting electro-magnet having its opposite ends connected with the poles or terminals of the stop signal 7 so that this coil is in series with the battery 8 and the push buttons 9. Opposite the pole of the core 11 arranged within the coil 10 is arranged an armature 12 which is adapted to be attracted by the pole of this core when the coil 10 is energized by the passage of the current from the battery 8 through the same upon closing one or the other of said push buttons. This armature is normally held away from the pole of the coil 10 by means of a spring 13, the extent to which this armature is movable away from this pole being regulatable by means of a stop screw 14 bearing against the outer or rear side of this armature in the usual and well known manner in which this is accomplished in instruments of this character.

When the starting coil 10 is energized and attracts its armature a starting switch is closed which comprises a movable contact 15 on the armature 12 engaging with a fixed contact 17, this switch forming part of an electric circuit containing the coil 18 of a transferring electromagnet, a battery 19 or other electric generator and two switch contacts 20, 21 of a cut-off switch which are arranged adjacent to the motorman. This last mentioned switch may be so organized that the same in its normal position is closed but is automatically opened when the motorman swings his car controlling lever 22 in a direction for starting the car but during the return movement of this lever for stopping the car this switch will remain closed. As shown in Fig. 1, this switch comprises a supporting frame or casing 23, a fixed curved contact 20 connected with one side of the circuit which includes the battery 19 and the coil 18 of the transferring electromagnet, a hand lever 24 pivoted on the casing in an upright position and having an inner arm which supports the movable contact 21 adapted to move into and out of engagement with the fixed contact 20 while its outer arm projects into the path of the motorman's car controlling lever, and two retaining springs 26, 27 which are connected at one of their ends with the inner arm of the cut-off switch lever 24 while their opposite ends are connected with the casing on opposite sides of the axis of the switch lever. Normally while the car is running the switch lever is in an upright position and is yieldingly retained in this position by the pull of the two contact springs 26, 27 being equalized and the car controlling lever of the motorman is arranged on the left hand side of the handle of this switch, as shown by full lines in Fig. 1. As the motorman swings the controlling lever from left to right for starting the car this lever swings over the upper arm of the switch lever 24 and turns the same but owing to the length of the curved contact 20 no electrical disconnection is produced between the fixed contact and the switch lever, and the latter is again returned to its central position after the controlling lever has cleared the same during the last part of its movement toward the right. During the first portion of the starting movement of the controlling lever from its position indicated by dotted lines at the right of the switch lever toward the left thereof this controlling lever first turns the switch lever in the opposite direction so as to break electrical connection between the same and the fixed curved contact 20 and then trips over this switch lever by the time it reaches the end of its movement toward the left so that the springs 26, 27 again operate to return this switch lever to its normal upright position in which it engages the fixed contact 20. If desired the lever 22 may be regarded as part of the means whereby the door of the car is opened and closed and so operated that when the door is closed the cut-off switch 20, 21 will be opened for discontinuing the safety signal.

Opposite the pole of the core of the coil of the transfer electro-magnet 18 is arranged an extension of the armature 12 so that when the coils of both the starting and transferring electro-magnets are energized the same operate in unison to attract and shift this armature in opposition to the resilience of the spring 13. As this armature is attracted by the coil of the starting electro-magnet 10 a transferring switch is closed comprising a fixed contact 28 arranged adjacent to the coil 10 and a removable contact 29 arranged on the armature 12, which contacts are arranged in an electric circuit containing a battery 30 or other electric generator, and the coil 31 of a holding electro-magnet. A movable armature 32 is arranged opposite the pole 33 of this last mentioned coil so that when the same is energized by the closing of the switch contacts 28, 29 the armature 32 will be attracted in opposition to a spring 34 which normally holds the same away from the pole 33 and against an adjustable stop consisting of a screw 35 mounted on a post 36, as shown in Fig. 1. When the armature 32 is attracted by the pole of the holding coil 31 an electric switch is closed comprising a fixed contact 37 and a movable contact 38 mounted on the armature 32 and engaging with this fixed contact. The members of this last mentioned switch form the terminals of an electric circuit which includes the safety signal lamps or other signal 1 which is adapted to warn persons in the vicinity of the street car that the same is about to stop and possibly remain at rest for a time. In the particular installation illustrated in Fig. 1 the movable contact 38 is arranged on one side of this safety signal circuit which is electrically connected with one of the wheels 4 of the street car resting on the rail or similar part and is also connected in series with the safety signal lamp 1 while the fixed contact 37 of this holding switch is connected by a branch line with the trolley wheel 6 which takes the current off the trolley wire.

Assuming that the parts are in the position indicated in Fig. 1 and that a passenger wishes to alight the first thing to do is to push one of the push buttons 9. This closes the circuit of the battery 8 through the electric stop signal 7 and notifies the motorman to stop the car at the next crossing or station. The pushing of the respective button also closes the electric circuit through the coil of the starting electromagnet so that the battery 8 energizes this coil and causes its pole to attract the armature 12. When this occurs the contacts 16, 17 of the starting switch and the contacts 28, 29 of the transferring switch are simultaneously closed. Inasmuch as at this time the switch 20, 21 is in its closed position the closing of the contacts 16, 17 of the starting switch causes the battery 19 to energize the coil 18 of the transferring electro-magnet, so that the latter now becomes active and at this time assists the coil 10 of the starting electro-magnet to retain the armature 12 in its attracted position in which the switches 16, 17 and 28, 29 are closed. Upon closing the contacts 28, 29 of the transferring switch the electric circuit of the coil 31 of the holding electro-magnet is closed and the latter becomes energized so that its armature 32 is attracted, thereby causing the switch 37, 38 to be closed and the safety signal 1 to be lighted. The latter may be placed at any convenient part of the car or a number of the same may be placed at different parts of the car as may be most desirable to effectually guard against possible accidents. In the case of street cars it is usually most desirable to place these safety signals at the rear end of the car in order to avoid collision with automobiles following on behind. This safety signal now remains lighted, if it is an electric lamp, or in operation if it is of a sound producing character, so long as the contacts 37, 38 of the cut off switch 20, 21 are in engagement, notwithstanding that the passenger has ceased pushing one or the other of the buttons because the closing of this holding switch 37, 38 which includes the safety lamps or signal is now no longer under the control of the battery 8 but is under the control of the battery 19 in the circuit of the transferring electro-magnet. The movement of the car controlling lever by the motorman from the left hand side of the cut-off switch lever to the right hand side of the same does not affect the electrical working of this switch owing to the fact that during such movement the inner contact arm 21 of this switch moves idly over the extended curved surfaces of the fixed contact 20. It will be apparent therefore that the safety signal 1 will therefore remain in operation from the time that the passenger gives the stop signal preparatory to alighting and also during the entire time that the car is at rest. The armature 12 is held in its operative position by the transferring electro-magnet after the release of the respective push button inasmuch as at this time only the coil 18 of this magnet is energized while the coil 10 of the starting electro-magnet is deënergized by reason of the push button having been released and the circuit of both the starting coil 10 and the stop signal 7 being now open.

As the motorman moves his controlling lever from right to left this lever engages the upper arm of the cut-off switch lever and turns the same momentarily in a direction in which its lower contact arm 21 swings toward the right out of engagement from the fixed contact arm 20 so that the circuit of the coil 10 of the transferring electro-magnet 18 is broken and the latter becomes deënergized. After the controlling lever has been pushed by the motorman to its fullest extent toward the left the latter again clears the cut-off switch lever and permits its springs 2 to restore this switch lever to its central normal operative position. The instant the transferring coil 18 becomes deënergized the spring 13 pulls the armature 12 away from the pole of this coil, thereby disconnecting the contacts 28, 29 of the transferring switch and opening the circuit of the coil 31 of the holding electro-magnet. Owing to the latter becoming inactive the armature 32 is now pulled away from the pole of the holding coil 31 by means of the spring 34, thereby separating the contacts 37, 38 of the holding electro-magnet and causing the safety signal lamps 1 to become extinguished. The parts are now again restored to the position which they normally occupy while the car is running and are ready to be operated for producing a temporary stop signal for the motorman and a prolonged safety signal which continues in effect from the time the stop signal has been given until the car is again started by the motorman, whereby the maximum safety for the passengers as well as of the operators of the car and persons in adjacent vehicles or automobiles is secured against accidents.

It will be obvious that this signal device is capable of many alterations in structure without departing from the spirit of this invention and that the same is not only useful for street cars but also automobiles, freight cars and switching engines or trains in industrial plants. The same can also be used to advantage in connection with various kinds of hazardous machinery or places where it is desirable to give a warning and more particularly relative to the starting or stopping of some movable part.

This signal device is comparatively simple in construction, it contains no delicate parts which are liable to get out of order and the same is very effective and reliable in operation so that the same can be depended upon for warning persons of any dangerous situation with absolute certainty that the signal when given will be maintained until it is deliberately cut off at a point other than the place where the signal originated.

We claim as our invention:

1. A signal apparatus comprising an electric safety signal circuit containing a safety signal, an electric generator and a holding switch, a holding electro-magnet operating said holding switch and having its coil arranged in a holding circuit containing a transferring switch and an electric generator, a transferring electro-magnet which holds said transferring switch closed and has its coil arranged in a transferring circuit containing an electric generator and a manually operated cut-off switch and a starting switch, and a starting electro-magnet which closes said starting and transferring switches and which is arranged in a starting circuit containing an electric generator and an initial switch.

2. A signal apparatus comprising an electric safety signal circuit containing a safety signal, an electric generator and a holding switch, a holding electro-magnet operating said holding switch and having its coil arranged in a holding circuit containing a transferring switch and an electric generator, a transferring electro-magnet which holds said transferring switch closed and has its coil arranged in a transferring circuit containing an electric generator and a manually operated cut-off switch and a starting switch, a starting electro-magnet which closes said starting and transferring switches and which is arranged in a starting circuit containing an electric generator and an initial switch, and a stop signal arranged in said last mentioned circuit and to be operated upon closing said initial switch.

3. A signal apparatus comprising an electric safety signal circuit containing a safety signal, an electric generator and a holding switch, a holding electro-magnet operating said holding switch and having its coil arranged in a holding circuit containing a transferring switch and an electric generator, a transferring electro-magnet which holds said transferring switch closed and has its coil arranged in a transferring circuit containing an electric generator and a manually operated cut-off switch and a starting switch, a starting electro-magnet which closes said starting and transferring switches and which is arranged in a starting circuit containing an electric generator and an initial switch, and a stop signal arranged in said last mentioned circuit and to be operated upon closing said initial switch, said cut-off switch having a movable switch lever which is yieldingly held in its central position.

4. A signal apparatus comprising an electric safety signal circuit containing a safety signal, an electric generator and a holding switch, a holding electro-magnet operating said holding switch and having its coil arranged in a holding circuit containing a transferring switch and an electric generator, a transferring electro-magnet which holds said transferring switch closed and has its coil arranged in a transferring circuit containing an electric generator and a manually operated cut-off switch and a starting switch, a starting electro-magnet which closes said starting and transferring switches and which is arranged in a starting circuit containing an electric generator and an initial switch, said cut-off switch having a movable switch lever which is yieldingly held in its central position, and an operating lever movable past said switch lever in two directions and to shift the latter while moving in one direction so as to open the starting circuit and while moving in the opposite direction to maintain said cut-off switch in its closed position.

Witness our hands this 12th day of March, 1915.

BENJAMIN M. DOWNS.
WALTER S. COOK.

Witnesses:
 THEO. L. POPP,
 ANNA HEIGIS.